United States Patent [19]
Gotoh

[11] Patent Number: 5,262,503
[45] Date of Patent: Nov. 16, 1993

[54] RANDOM COPOLYMERS AND CROSSLINKED PRODUCTS OF THE SAME

[75] Inventor: Shiroh Gotoh, Yokkaichi, Japan

[73] Assignee: Mitsubishi Petrochemical Company Limited, Tokyo, Japan

[21] Appl. No.: 705,585

[22] Filed: May 24, 1991

[30] Foreign Application Priority Data

May 24, 1990 [JP] Japan ................................ 2-134476

[51] Int. Cl.$^5$ ...................... C08F 236/20; C08L 47/00
[52] U.S. Cl. .................................. 526/336; 526/335; 525/232; 525/332.1; 525/387; 521/95; 521/140; 521/150
[58] Field of Search ................... 521/140, 150, 95; 525/232, 332.1, 387, 132; 526/335, 336

[56] References Cited

U.S. PATENT DOCUMENTS

| | | | |
|---|---|---|---|
| 3,351,621 | 11/1967 | Baskai | 526/336 X |
| 3,481,909 | 12/1969 | DiPietro | 526/336 X |
| 4,366,296 | 12/1982 | Kitagawa et al. | 526/336 X |

OTHER PUBLICATIONS

Neilsen, "Mechanical Properties of Polymers . . . ", Marcel Dekker, Inc., N.Y., 54-56 (1974).
Patent Abstracts of Japan, vol. 14, No. 220 (C-717) [4163], May 10, 1990 & JP-A-2 51 512 (Japan Synth. Rub) Feb. 21, 1990.
Patent Abstracts of Japan, vol. 14, No. 334 (C-742) [4277], Jul. 18, 1990; & JP-A-2 123 114 (Jap Synth. Rub) Oct. 5, 1990.
FR-A-1 295 575 (E. I. Du Pont) *Claims; p. 1, right--hand column, paragraph 1.

*Primary Examiner*—Fred Teskin
*Attorney, Agent, or Firm*—Oblon, Spivak, McClelland, Maier & Neustadt

[57] ABSTRACT

A random copolymer of (a) an α-olefin having 3 to 12 carbon atoms, (b) a non-conjugated diene represented by the following formula (1):

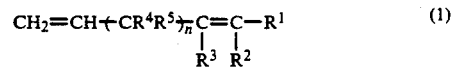

wherein $R^1$ represents a hydrogen atom or an alkyl group having 1 to 8 carbon atoms, $R^2$, $R^3$, $R^4$ and $R^5$ each independently represent a hydrogen atom or an alkyl group having 1 to 8 carbon atoms, and n is a number of from 2 to 10, and (c) optionally ethylene, which random copolymer comprises 0.1 to 15 mol % of monomer units of said non-conjugated diene, 0 to 4 mol % of monomer units of ethylene, and pendent ethylenical unsaturations, and has a crystallization degree of 20% or more determined by an X-ray diffraction method, a melt index of 0.01 to 200 g/10 minutes, and a modulus of elasticity according to JIS K-7203 of 1,000 to 30,000 kg/cm$^2$. The random copolymer can be in the crosslinked form through the pendent ethylenical unsaturation and can also be in the form of a blend of the copolymer with a thermoplastic polymer compatible therewith. The crosslinking can be conducted on the blend of the random copolymer with the thermoplastic polymer, and can also be conducted under the conditions that the random copolymer and/or the thermoplastic polymer are/is foamed whereby the crosslinked product is obtained as a foam.

9 Claims, No Drawings

RANDOM COPOLYMERS AND CROSSLINKED PRODUCTS OF THE SAME

BACKGROUND OF THE INVENTION

1. Field of the Invention

This invention relates to a random copolymer, a crosslinked product thereof, and a composition comprising the crosslinked product.

The random copolymer according to the present invention is a novel copolymer comprising monomer units of a non-conjugated diene having a specific structure. A crosslinked product of the random copolymer, and a composition comprising the crosslinked product have high tensile strength and high elasticity even when their degree of crosslinking or gel fraction is high, and also exhibit high resistance for abrasion.

2. Description of the Related Art

Polyolefins have excellent properties from the viewpoint of practical use, so that they have been widely used as they are, or as a mixture of two or more kinds of polyolefins. In addition, modified polyolefins such as a polyolefin which has grafted thereinto an unsaturated organic acid or a derivative thereof, or an unsaturated aromatic monomer, and a crosslinked polyolefin, are also employed in a wide variety of fields.

Of the polyolefins, polypropylene resins including propylene homopolymers or polypropylene and propylene copolymers such as a block or random copolymer of propylene with ethylene, and polyethylene resins including ethylene homopolymer or polyethylene, and ethylene copolymers such as a copolymer of ethylene with propylene and a copolymer of ethylene with propylene and butene are of considerable utility.

In particular, attention has been focused on crosslinked products of polypropylene resins because of their advantageous properties such as of high rigidity, high melting points, glossiness, transparency, and excellent electric characteristics.

However, poly(α-olefin) resins other than polyethylene resins are known in the art to have problems, as polypropylene resins typically show such that the resins contain a hydrogen atom bonded to the tertiary carbon atom of each recurring monomer unit thereof, and, accordingly, a radical crosslinking method such as a method in which a peroxide or radiation is employed to induce a crosslinking reaction is not applicable to obtain a crosslinked product of poly(α-olefin) resins. This is because cleavage of the main chain of the poly(α-olefin) resin occurs prior to a crosslinking reaction when the above radical crosslinking method is applied. For this reason, the resulting crosslinked product is not practically usable, and cannot be processed into a highly expanded or compressed article.

The use of a crosslinking aid is therefore essential to obtain crosslinked products of poly(α-olefin) resins such as a polypropylene resin, and various proposals have hitherto been made on the crosslinking aid which is effective to obtain a crosslinked product of a polypropylene resin. Examples of such methods include, for instance, a method disclosed in Japanese Patent Publication No. 45-23035 in which a rubber such as polybutadiene rubber, natural rubber or a polyisoprene rubber is blended, a method disclosed in Japanese Patent Publication No. 53-28060 in which a liquid 1,2-polymer of butadiene is blended, and a method disclosed in Japanese Laid-Open Patent Application No. 53-138470 in which a syndiotactic 1,2-polymer of butadiene, is blended.

However, the crosslinked products of polypropylene resins obtained by the above conventional methods are remarkably poor in resistances for heat, ozone and weather. This is because the above-described crosslinking aid contain a double bond in their main chains, or the tertiary carbon atom in the main chain thereof is in the allyl position. Moreover, the above crosslinking aids are gummy, and a polypropylene resin mixed with any of the crosslinking aids, the resulting mixture is to have poor mechanical properties of such as rigidity, and the advantages of the polypropylene resin which inherent has high rigidity are thus impaired.

In order to solve the above problems, proposals have been made as disclosed in Japanese Patent Publication No. 64-2139, and Japanese Laid-Open Patent Applications Nos. 58-210930, 58-210931 and 61-252248. These proposals are based on the use of copolymers of an α-olefin and an 1,4-diene, and crosslinked product thus obtained overcome, to a certain extent, the drawbacks in the prior art. However, such crosslinking or crosslinked products are still insufficient in the crosslinking efficiency, tensile strength, elasticity and resistance for abrasion.

Japanese Laid-Open Patent Application No. 59-155416 discloses a method for preparing a block copolymer, in which a non-conjugated diene represented by the following formula is indispensably employed:

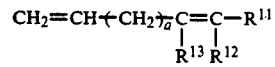

wherein a is an integer of from 1 to 10, and $R^1$, $R^{12}$ and $R^{13}$ each independently represent a hydrogen atom or an alkyl group having 1 to 8 carbon atoms. A crosslinked product of the block copolymer obtained by the above method has impact resistance. However, it may have low transparency, so that it would not be utilized without limitation. The above polymer may also be disadvantageous in that the foaming conducted simultaneously with the crosslinking would not give a crosslinked foam product having cells which are uniform in size.

Japanese Laid-Open Patent Application No. 2-51512 discloses a random copolymer of ethylene, an α-olefin having 3 to 12 carbon atoms, and a non-conjugated olefin represented by the following formula:

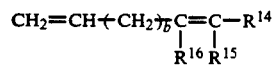

wherein b is an integer of from 2 to 10, and $R^{14}$ represents an alkyl group having 1 to 8 carbon atoms, and $R^{15}$ and $R^{16}$ each independently represent a hydrogen atom or an alkyl group having 1 to 8 carbon atoms, the ethylene and the α-olefin being bonded with each other in a molar ratio of (5-90)/(95-10), and the content of monomer units of the non-conjugated diene contained in the copolymer being such that the iodine value of the copolymer is 3 or higher; and a composition comprising 100 parts by weight of the above random copolymer, 0 to 300 parts by weight of a reinforcement, 0 to 150 parts by weight of a softening agent, and 0.1 to 10 parts by weight of a crosslinking agent. The Specification of the above Patent Application, however, simply describes that the random copolymer can improve the vulcanization speed of the composition comprising it.

The inventors of the present invention have proposed a method for preparing an improved copolymer of propylene, 6-methyl-1,6-octadiene and/or 7-methyl-1,6-octadiene, and optionally ethylene as disclosed in U.S. Pat. No. 4,987,193. Specifically, the method is such that an unsaturated copolymer of propylene and the branched diene which is 6-methyl-1,6-octadiene and/or 7-methyl-1,6-octadiene, and optionally ethylene, is produced by a two-step process wherein in a first polymerization step homopolymerization of propylene is conducted until the propylene polymer amounts to 0.01 to 10% by weight of the total and final copolymer, and in a second polymerization step the random copolymerization of propylene, 6-methyl-1,6-octadiene and/or 7-methyl-1,6-octadiene, and optionally, ethylene is then conducted as a continuation of the first step polymerization.

SUMMARY OF THE INVENTION

An object of the present invention is to provide a random copolymer of (a) an α-olefin having 3 to 12 carbon atoms, (b) a non-conjugated diene represented by the formula (1):

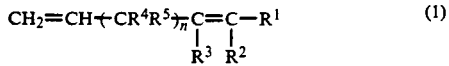

wherein $R^1$ represents a hydrogen atom or an alkyl group having 1 to 8 carbon atoms, $R^2$, $R^3$, $R^4$ and $R^5$ each independently represent a hydrogen atom or an alkyl group having 1 to 8 carbon atoms, and n is a number of from 2 to 10, and (c) optionally ethylene, which random copolymer comprises 0.1 to 15 mol % of monomer units of the non-conjugated diene, 0 to 4 mol % of monomer units of ethylene, and pendent ethylenical unsaturations, and has a crystallization degree of 20% or more determined by an X-ray diffraction method, a melt index of 0.01 to 200 g/10 minutes, and a modulus of elasticity according to Japan Industrial Standard (JIS) K-7203 equivalent to ASTM D790M-86 of 1,000 to 30,000 kg/cm².

Another object of the present invention is to provide a crosslinked product of a random copolymer of (a) an α-olefin having 3 to 12 carbon atoms, (b) a non-conjugated diene represented by the formula (1):

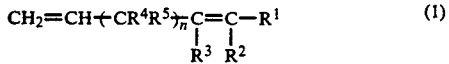

wherein $R^1$ represents a hydrogen atom or an alkyl group having 1 to 8 carbon atoms, $R^2$, $R^3$, $R^4$ and $R^5$ each independently represent a hydrogen atom or an alkyl group having 1 to 8 carbon atoms, and n is a number of from 2 to 10, and (c) optionally ethylene, which random copolymer comprises 0.1 to 15 mol % of monomer units of the non-conjugated diene, 0 to 4 mol % of monomer units of ethylene, and pendent ethylenical unsaturations, and has a crystallization degree of 20% or more determined by an X-ray diffraction method, a melt index of 0.01 to 100 g/10 minutes, gel content of 5 wt% or more, and a modulus of elasticity according to JIS K-7203 of 1,000 to 30,000 kg/cm², the crosslinking having taken place through the pendent ethylenical unsaturations.

A further object of the present invention is to provide a blend of:
a Component (A) which is a random copolymer of (a) an α-olefin having 3 to 12 carbon atoms, (b) a non-conjugated diene represented by the following formula (1):

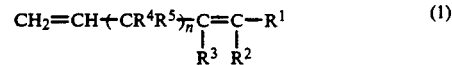

wherein $R^1$ represents a hydrogen atom or an alkyl group having 1 to 8 carbon atoms, $R^2$, $R^3$, $R^4$ and $R^5$ each independently represent a hydrogen atom or an alkyl group having 1 to 8 carbon atoms, and n is a number of from 2 to 10, and (c) optionally ethylene, which random copolymer comprises 0.1 to 15 mol % of monomer units of the non-conjugated diene, 0 to 4 mol % of monomer units of ethylene, and pendent ethylenical unsaturations, and has a crystallization degree of 20% or more determined by an X-ray diffraction method, a melt index of 0.01 to 200 g/10 minutes, and a modulus of elasticity according to JIS K-7203 of 1,000 to 30,000 kg/cm²; and a Component (B) which is a thermoplastic polymer the composition comprising 0.1 mol % or more and less than 15 mol % of monomer units of the non-conjugated diene, the random copolymer being crosslinked through the pendent ethylenical unsaturations.

The random copolymer according to the present invention is a novel polymer. A crosslinked product of the random copolymer and a composition comprising the crosslinked product have improved heat resistance and solvent resistance as well as those properties which are inherent in poly(α-olefin) resins. In particular, the crosslinked product of the random copolymer of the invention can be obtained with high efficiency, and is excellent in tensile strength, elasticity, and resistance for abrasion.

In the case where the random copolymer prepared by copolymerizing the non-conjugated diene with the α-olefin which is solely or mainly propylene is subjected to a crosslinking reaction, the resulting crosslinked product has high rigidity, a high melting point, glossiness, transparency, and excellent electric properties, which are the characteristics inherent in a polypropylene resin. In addition, the crosslinked product has high abrasion resistance, and reveals high tensile strength and high elasticity. The crosslinked product has improved deep drawability and improved foamability and can give a desirable material with high quality in good balance.

Furthermore, a crosslinked product of the random copolymer prepared by copolymerizing the non-conjugated diene with an α-olefin which is 3-methylbutene has high heat resistance in addition to the above advantageous properties of the crosslinked product of the copolymer when the α-olefin used is propylene.

In the present invention, a crosslinked product can also be obtained by subjecting a composition comprising the random copolymer of the present invention, and unsaturated rubber blended therewith such as natural rubber, polyisoprene rubber, polybutadiene rubber, ethylene - α-olefin - diene terpolymer rubber, or butyl rubber to a crosslinking reaction. Since the random copolymer and the unsaturated rubber blended are crosslinked or vulcanized with each other in the course of the crosslinking reaction, a heat-resistive rubber having high rigidity and high mechanical strength can be obtained.

It is also possible to modify the unsaturated groups pendent in the random copolymer of the invention. The random copolymer can be subjected to a crosslinking reaction after modification of part of the unsaturated groups. Moreover, the unsaturated groups on or remaining on the surface of the crosslinked product can also be modified. By such a modification, the crosslinked product can be imparted with, as another characteristics in accordance with the present invention, properties, mainly those related to polarity, and not resided in conventional polyolefins, whereby the modified product is excellent in the properties concerning adhesion, coating and printing. A functional group is sometimes introduced into the random copolymer because of oxidation of the unsaturated groups during the crosslinking reaction. In this case, the above-described properties may be successfully imparted to the resulting crosslinked product without conducting any separate modification of the unsaturated groups.

Since the crosslinked product according to the present invention has the above advantages, it can give an excellent foamed product, and is utilizable for parts of cars, coating materials of electric wires, parts of household electric appliances, pipes for hot water, and trays for use in the distribution.

DETAILED DESCRIPTION OF THE PREFERRED EMBODIMENTS

Random Copolymer

The random copolymer according to the present invention will now be explained in detail.

The random copolymer of the invention can be prepared by copolymerizing (a) an α-olefin having 3 to 12 carbon atoms, (b) a non-conjugated diene represented by the following formula (1):

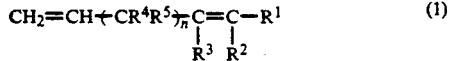

wherein $R^1$ represents a hydrogen atom or an alkyl group having 1 to 8 carbon atoms, preferably an alkyl group having 1 to 3 carbon atoms, $R^2$, $R^3$, $R^4$ and $R^5$ each independently represent a hydrogen atom or an alkyl group having 1 to 8 carbon atoms, preferably a hydrogen atom or an alkyl group having 1 to 3 carbon atoms, n is a number of from 2 to 10, preferably from 2 to 5, and, if necessary, (c) ethylene in the presence of a known Ziegler catalyst. The above copolymerization reaction may be carried out in accordance with any known method and apparatus which are applicable to polymerization of α-olefin monomers.

Examples of the α-olefin having 3 to 12 carbon atoms usable for preparing the random copolymer of the invention include propylene, butene-1, pentene-1, hexene-1, octene-1, 3-methyl-butene-1, 3-methyl-pentene-1, 4-methyl-pentene-1, 3,3-dimethyl-butene-1, 4,4-dimethylpentene-1, 3-methyl-hexene-1, 4-methyl-hexene-1, 4,4-dimethyl-hexene-1, 5-methyl-hexene-1, allylcyclopentane, allylcyclohexane, styrene, allylbenzene, 3-cyclohexylbutene-1, vinylcyclopropane, vinylcyclopentane, vinylcyclohexane, and 2-vinylbicyclo[2,2,1]-heptane. Of these α-olefins, an cyclic α-olefin of 3 to 8 carbon atoms such as propylene, butene-1, 3-methylbutene-1, 4-methylpentene-1 and aromatic α-olefin such as styrene are preferred in particular, and propylene is most preferable. The above α-olefins can be used either singly or in combination. In the case where two or more kinds of the above α-olefins are used in combination, it is necessary that the amount of one of the α-olefins employed be 70 wt. % or more, preferably 80 wt. % or more, and more preferably 90 wt. % or more, of the total amount of the α-olefins.

Examples of the non-conjugated diene represented by the formula (1), usable for preparing the random copolymer of the invention include 1,5-dienes such as 1,5-heptadiene, 5-methyl-1,5-heptadiene, 6-methyl-1,5-heptadiene, 1,5-octadiene, 5-methyl-1,5-octadiene and 6-methyl-1,5-octadiene; 1,6-dienes such as 1,6-octadiene, 6-methyl-1,6-octadiene, 7-methyl-1,6-octadiene, 7-ethyl-1,6-octadiene, 1,6-nonadiene, 7-methyl-1,6-nonadiene and 4-methyl-1,6-nonadiene; 1,7-dienes such as 1,7-nonadiene and 8-methyl-1,7-nonadiene; and other non-conjugated dienes such as 1,11-dodecadiene and 1,13-tetradecadiene. Of these non-conjugated dienes, branched non-conjugated dienes such as 6-methyl-1,5-heptadiene, 6-methyl-1,5-octadiene, 6-methyl-1,6-octadiene, 7-methyl-1,6-octadiene, 7-ethyl-1,6-octadiene and 8-methyl-1,7-nonadiene are preferred, and, in particular, 7-methyl-1,6-octadiene is preferred when the current technique for preparing the copolymer is taken into consideration. The above-enumerated non-conjugated dienes can be used either singly or in combination.

A preferred species of the random copolymer of the present invention is a random copolymer consisting essentially of (a) monomer units of an α-olefin having 3 to 12 carbon atoms, preferably the preferred species given above, namely propylene, butene-1,3-methylbutene-1, 4-methyl-pentene-1 or styrene, more preferably propylene, and (b) monomer units of a non-conjugated diene represented by the formula (1), preferably the preferred species given above, namely 6-methyl-1,5-heptadiene, 6-methyl-1,5-octadiene, 6-methyl-1,6-octadiene, 7-methyl-1,6-octadiene, 7-ethyl-1,6-octadiene or 8-methyl-1,7-nonadiene, more preferably 7-methyl-1,6-octadiene.

The random copolymer of the present invention contains from 0.1 to 15 mol %, preferably from 0.2 to 12 mol %, and more preferably from 0.5 to 8 mol %, still more preferably from 0.5 to 5 mol %, of monomer units of the non-conjugated diene. When the content of the monomer units of the non-conjugated diene is less than 0.1 mol %, the random copolymer has only a few unsaturation, and may not fully enjoy the crosslinking effect. On the other hand, when the content of the monomer units of the non-conjugated diene is in excess of 15 mol %, the random copolymer is produced with low productivity, and in addition, the copolymer is sticky or cannot be in a state of polymer due to its extremely low crystallization degree.

In the present invention, ethylene is optionally employed together with the α-olefin and the non-conjugated diene to prepare the random copolymer. By properly introducing an ethylene unit to the copolymer, properties such as transparency, flexibility and a melting point of the resulting copolymer can be controlled or improved as desired. Therefore, the amount of the ethylene unit to be contained in the copolymer is determined depending on the use of the resulting copolymer and/or other various conditions. However, in general, the amount of the ethylene unit contained in the copolymer of the invention is from 0 to 4 mol %, preferably from 0 to 3.5 mol %, and more preferably from 0 to 2 mol %. When the content of the ethylene unit is larger than 4 mol %, the random copolymer has a low crystallization degree, and cannot reveal the properties inherent to a resin.

The crystallization degree of the random copolymer of the present invention is preferably 20% or more when determined by a known X-ray diffraction method. For instance, the crystallization degree of the random copolymer prepared by using propylene as the α-olefin is determined in accordance with the method described in Rend. Accad. Naz. Lincei. 22 (8), 11 (1957) by G. Natta et al. In this case, the preferred crystallization degree is preferably 25% or more.

The melt index of the random copolymer of the present invention is from 0.01 to 200 g/10 minutes, preferably from 0.1 to 100 g/10 minutes.

The melting point of the random copolymer of the invention determined by DSC indicated as a peak temperature at which the copolymer is fused is from 100° to 330° C., preferably from 110° to 300° C. In the case of the random copolymer whose α-olefin used is propylene, it is preferable that the melting point thereof be in the range of from 120° to 160° C. The copolymer having a melting point of lower than 100° C. is unfavorable because it is rubbery and cannot reveal sufficiently high heat resistance.

The random copolymer of the present invention is a resin in nature or properties. The modulus of flexural elasticity of the random copolymer according to JIS K-7203 is from 1,000 to 30,000 kg/cm$^2$, preferably from 1,000 to 25,000 kg/cm$^2$. In particular, the modulus of flexural elasticity of the copolymer whose α-olefin used is propylene is preferably from 1,500 to 10,000 kg/cm$^2$. The random copolymer having a modulus of flexural elasticity of less than 1,000 kg/cm$^2$ cannot exhibit sufficiently high heat resistance.

Preparation of Random Copolymer

[I] Catalyst for Polymerization

To prepare the random copolymer of the present invention, the above-described monomers are copolymerized in the presence of a Ziegler catalyst for use in a sterospecific polymerization reaction comprising a known "reduced" type highly active titanium trichloride composition and an organoaluminum compound, or a Ziegler catalyst for use in a seterospecific polymerization reaction comprising a solid titanium catalytic component comprising as essential components titanium, magnesium, a halogen and an electron donor, and an organoaluminum compound. In particular, the latter Ziegler catalyst is preferable because it can minimize by-production of a soluble polymer.

[II] Random Copolymerization

A method for preparing the random copolymer of the present invention is such that the α-olefin, the non-conjugated diene, and if necessary ethylene are copolymerized in the presence of such known Ziegler catalyst as given above. It is not necessary to maintain the monomer ratio in the reaction system at the constant level during the copolymerization reaction. The monomers in a specific ratio can be charged to the reaction system in the course of the reaction. It is also acceptable to change the ratio of the monomers during the reaction. Further, one of the monomers, in particular, the non-conjugated diene can be charged portionwise and several times to the reaction system.

Any polymerization method is applicable as long as the monomers and the catalyst can be effectively brought into contact with each other. For instance, a slurry polymerization method in which an inert solvent is used, a slurry polymerization method in which substantially no inert solvent is used but instead the α-olefin and the non-conjugated diene themselves act as solvents, and a vapor phase polymerization method in which each monomer is kept in a gaseous state without any liquid solvent used are suitable for preparing the random copolymer of the present invention.

The conditions for the polymerization reaction vary depending upon the polymerization method adopted. In general, however, it is preferable that the polymerization reaction be carried out at a temperature of from 30° to 100° C., preferably from 40° to 90° C., and more preferably from 50° to 80° C., and under a pressure of from 0 to 45 kg/cm$^2$G, preferably from 1 to 40 kg/cm$^2$G, and more preferably from 2 to 36 kg/cm$^2$G.

The molecular weight of the random copolymer produced can be controlled by any known technique. Practically, however, hydrogen is most preferably employed during the copolymerization for the purpose.

For preparing the random copolymer with improved productivity, it is effective to polymerize by and on the catalyst a small amount of an α-olefin monomer before conducting random copolymerization reaction. The α-olefin used for the preliminary polymerization may be the same as or different from the α-olefin which is copolymerized with the non-conjugated diene to give the random copolymer of the invention.

Crosslinking

The random copolymer of the present invention has specific unsaturated groups or pendent ethylenical unsaturations on its side chains. Therefore, any conventional crosslinking method which is employed for crosslinking of unsaturated polymers such as unsaturated rubber can be employed to obtain a crosslinked product of the random copolymer of the invention. For instance, the following methods are all employable in the present invention: a method in which a radical generating agent is employed as a crosslinking agent, a method in which radiation is applied to induce a crosslinking reaction, a method in which a resin is used as a crosslinking agent, and a method in which a quinoid is employed as a crosslinking agent.

In some cases, for instance, in the case where radiation is employed to induce a crosslinking reaction, radicals generated on the main chain of the random copolymer may undergo crosslinking in addition to the crosslinking between the pendent ethylenical unsaturations. In the present invention, such a crosslinking reaction is also included in the "crosslinking through the pendent ethylenical unsaturations".

The crosslinked product of the random copolymer according to the present invention can be prepared in the above-described method, and either part of or all of the pendent ethylenical unsaturations contained in the random copolymer are utilized for the crosslinking. When the crosslinked product still contains ethylenical unsaturations therein, they can be utilized for modification of the product.

(1) Crosslinking by Means of Radical Generating Agent

A so-called radical polymerization initiator is used as the radical generating agent to obtain a crosslinked product of the random copolymer of the present invention.

Examples of the radical generating agent usable in the present invention include organic peroxides such as hydroperoxides, dialkylperoxides, diacylperoxides, peracid esters and ketone peroxides; inorganic peroxides such as hydrogen peroxide, peroxosulfates and metal peroxides; azo compounds, monosulfides, disulfides, metal chelate compounds, and redox initiators. Of these agents, organic peroxides are preferred. Particularly preferred are those organic peroxides which have a temperature at which a half of the peroxide in question is decomposed in one minute of 100° C. or higher, preferably 120° C. or higher, and more preferably 140° C. or higher. The wording "peroxide" herein includes "hydroperoxide".

Specific examples of the hydroperoxides preferably usable in the present invention are t-butylhydroperoxide, cumene-hydroperoxide, diisopropylbenzenehydroperoxide, p-methane-hydroperoxide, 2,5-dimethylhexane-2,5-dihydroperoxide, and pinanehydroperoxide.

Specific examples of the dialkylperoxide preferably usable in the present invention are di-t-butylperoxide, t-butyl-cumenylperoxide, dicumenylperoxide, a,a'-bis(t-butylperoxy)-p-diisopropylbenzene, 2,5-dimethyl-2,5-di(t-butylperoxy)hexane, and 2,5-dimethyl-2,5-di(t-butylperoxy)-hexyne-3.

Specific examples of the diacylperoxides are acetylperoxide, succinic acid peroxide, benzoylperoxide, and 2,4-dichlorobenzoylperoxide.

Specific examples of the peracid esters preferably usable in the present invention are t-butyl peroxyacetate, t-butyl peroxyisobutyrate, t-butyl peroxy-2-ethylhexanoate, t-butyl peroxy-3,5,5-trimethylhexanoate, t-butyl peroxylaurate, t-butyl peroxybenzoate, di-t-butyl diperoxyphthalate, 2,5-dimethyl-2,5-di(benzoylperoxy)hexane, t-butyl peroxymaleate, and t-butyl peroxyisopropylcarbonate.

Specific examples of the ketone peroxides preferably usable in the present invention are methyl ethyl ketone peroxide, cyclohexanone peroxide, and 1,1-bis(t-butylperoxy)-3,5,5-trimethylcyclohexane.

Of the above-enumerated organic peroxides, the following peroxides are, in particular, more preferably employed in the present invention: 2,5-dimethylhexane-2,5-dihydroxyperoxide, di-t-butylperoxide, t-butyl-cumenylperoxide, dicumenylperoxide, a,a-bis(t-butylperoxy)-p-diisopropylbenzene, 2,5-dimethyl-2,5-di(t-butylperoxy)hexane, 2,5-dimethyl-2,5-di(t-butylperoxy)-hexyne-3, benzoylperoxide, and t-butyl peroxyisopropylcarbonate.

These radical generating agent are employed in an amount, in general, of from 0.01 to 15 parts by weight, preferably from 0.05 to 10 parts by weight, per 100 parts by weight of the random copolymer of the invention.

Any conventionally known crosslinking method is applicable in the present invention. For instance, the following methods are employable: a method in which the random copolymer of the invention and a thermoplastic polymer used upon necessity, is fused and mixed along with the radical generating agent while heating the mixture; a method in which the random copolymer and the radical generating agent are respectively dissolved in a solvent and the resulting solutions are mixed with each other while heating, followed by vaporization of the solvent; and a method in which the random copolymer or its composition in the form of powder or pellets and the like is immersed, while heating, in a solution of the radical generating agent in a solvent, followed by removal of the solvent.

In the above methods, the heating is conducted at temperature of from 120° to 300° C. for appropriate time. Further heating can be applied if so desired.

The random copolymer and the radical generating agent are fused and mixed with each other either in a continuous method or in a batch method by using an apparatus such as a V-blender, a Henschel mixer, a mixing roller, a Banbury mixer, a kneading extruder, a kneader, or a Brabender plastogram.

(2) Crosslinking by Means of Irradiation

The random copolymer can be crosslinked by irradiation with $\gamma$-rays generated from cobalt 60 or cesium 137, electron beams generated by an electron beam accelerator, X-rays generated by an X-ray generator, ultraviolet rays, proton beams, $\alpha$-rays, a $\beta$-rays, and neutron rays. Of these, preferable ones are $\gamma$-rays which are now safely obtainable thanks to the development in the atomic industries, and electron beams which are obtainable at a high energy level at a relatively low cost by an improved accelerator.

The amount of irradiation is, in general, from 0.01 to 500 Mrad, preferably from 0.1 to 100 Mrad.

The crosslinking reaction by means of irradiation is characterized in that the reaction can be carried out at any temperature. However, in the present invention, the crosslinking reaction is carried out at from 0° C. to a melting point or softening point of the random copolymer of the invention or of a composition comprising it, and preferably at a temperature of from 15° to 100° C. There is of course no problem even if the crosslinking reaction is carried out at a temperature lower or higher than the above range.

The crosslinking reaction can also be carried out under any atmosphere, for instance, under an atmosphere of air or an inert gas, or under reduced pressure.

The above-described organic peroxides can also be co-employed in this crosslinking method.

(3) Crosslinking by Means of Resin

A crosslinked product of the random copolymer of the present invention can be prepared by using as a crosslinking agent a phenol resin such as an alkylphenol resin or a bromoalkylphenol resin, wherein a catalyst for the crosslinking is used such as stannous chloride, ferric chloride, an organic sulfonic acid, polychloroprene or chlorosulfonated polyethylene.

The amount of the resin used as a crosslinking agent is, in general, from 1 to 30 parts by weight, preferably from 5 to 20 parts by weight, per 100 parts by weight of the random copolymer of the invention; and the amount of the catalyst is from 0.1 to 10 parts by weight, preferably from 0.5 to 5 parts by weight, per 100 parts by weight of the random copolymer.

The crosslinking reaction wherein the above crosslinking agent and catalyst are used is generally carried out at a temperature of from 100° to 300° C., preferably from 130° to 250° C.

(4) Crosslinking by Means of Quinoid

A crosslinked product of the random copolymer of the present invention can be prepared by using, as a crosslinking agent, p-quinonedioxime and lead dioxide in combination, or p,p'-dibenzoylquinonedioxime and trilead tetroxide in combination.

The amount of the quinoneoxime compound is from 0.1 to 10 parts by weight, preferably from 0.5 to 5 parts by weight, per 100 parts by weight of the random copolymer; and the amount of the lead oxide compound is from 0.1 to 15 parts by weight, preferably from 0.5 to 10 parts by weight, per 100 parts by weight of the random copolymer.

The crosslinking reaction by means of the quinone compound is carried out at a temperature of from 90 to 280° C., preferably from 110° to 250° C.

(5) Crosslinking Upon Foaming

A crosslinking-foaming method is also employable in the present invention, which utilizes such a property that the melt viscosity of a copolymer increases when it is crosslinked.

When a physical foaming agent, or a chemical foaming agent having a relatively low decomposition temperature such as sodium hydrogencarbonate is used with the random copolymer of the invention or a composition comprising it, a crosslinking reaction and foaming are, in general, caused at the same time under pressure, at a temperature in the vicinity of or higher than the melting point or softening point of the copolymer or the composition comprising it.

On the other hand, when a chemical foaming agent having a relatively high decomposition temperature such as azodicarboxylic amide is used with the random copolymer of the invention or a composition comprising it, foaming can be caused simultaneously with, or after completion of the crosslinking reaction, at a temperature of from 120° to 300° C., preferably from 140° to 270° C., under atmospheric pressure or under pressure. In the case where a crosslinking reaction is carried out prior to foaming, the reaction is required to be carried out at a temperature lower than the decomposition temperature of the foaming agent employed.

A composition comprising the random copolymer of the invention, and the following auxiliary components in such amounts that the effects of the present invention are not remarkably impaired can also give a crosslinked product of the present invention. Examples of the auxiliary components usable in the present invention include thermoplastic resins which are compatible with the random copolymer of the invention; stabilizing agents which are phenolic, sulfur-containing, phosphorus-containing or amines including an antioxidant, a heat stabilizer, an ultraviolet absorber and an antistatic agent; inorganic fillers such as silica, mica, talc, calcium carbonate, carbon black, glass fiber, fine spherical glass, carbon fiber, plaster, clay, aluminum hydroxide, magnesium hydroxide and titanium oxide; coloring agents and pigments; flame retarders; surface active agents; and controllers or retarders for the crosslinking reaction.

The crosslinked product has a gel fraction which is at least 5% by weight, preferably 7 to 95% by weight, and is preferably 20 to 70% by weight when the crosslinked product is foamed. The melt index of the crosslinked product is usually lower than that of the product before foaming. The melt index of the crosslinked product is 0.01 to 100 g/10 minutes, preferably 0.01 to 50 g/10.

Polymer Blend

The random copolymer and preferably the crosslinked product thereof according to the present invention are useful as they are. However, a blend or a coherent blend of the random copolymer, or preferably the crosslinked product thereof, (Component A) with a thermoplastic resin (Component B) which is compatible with the Composition A has also a wide variety of industrial utilities.

In this case, it is necessary that the amount of monomer units of the non-conjugated diene be so controlled that the blend of the Component A and the Component B contain 0.1 mol % or more and less than 15 mol %, preferably from 0.5 to 8 mol %, especially preferable from 0.5 to 5 mol %, of the monomer units.

Examples of the thermoplastic resin to be used as the Component B compatible with the random copolymer of the invention or with the crosslinked product thereof, the crosslinking being conducted after the blending, are as follows:

(i) Polymers of $\alpha$-olefins having 2 to 8 carbon atoms such as ethylene, propylene, butene-1, pentene-1 and 4-methyl-1-pentene such as homopolymers and interpolymers of these $\alpha$-olefins; derivatives by such chemical modification of the above polymers of $\alpha$-olefins as, for example, grafting with an unsaturated organic acid or a derivative thereof such as its anhydride, chlorination, sulfonation, styrenation, and oxidation; copolymers of the $\alpha$-olefins referred to above with a monomer copolymerizable therewith other than the $\alpha$-olefins such as an unsaturated organic acids, derivatives thereof, vinyl esters and an unsaturated organosilane compounds and derivatives by chemical modification of the copolymers including saponified products of copolymers of ethylene and vinylacetate;

(ii) polystyrenes; acrylonitrile-butadiene-styrene resins (ABS); polyamides; polyesters; polycarbonates; polyvinyl chlorides; and styrene-butadiene-styrene block copolymers;

(iii) ethylene-propylene rubbers, which are also examples of the polymers of $\alpha$-olefins shown in the item (i), including EPDM; and ethylene-1-butene rubbers including terpolymer rubber in which a polyene is further copolymerized; and (iv) natural rubbers; polybutadiene rubbers; polyisoprene rubbers; styrene-butadiene rubbers (SBR); and butyl rubbers.

Of the above-enumerated polymers, those polymers which comprise monomer units of an $\alpha$-olefin as the predominant units are preferred.

When the crosslinking reaction of the random copolymer is conducted when the copolymer (Component A) is in the form of a blend with the Component B, a blend of the Components A and B wherein the Component A is crosslinked will be obtained, which blend is preferable in the present invention.

The previously-mentioned foaming method is also applicable when the above blend is subjected to a crosslinking reaction, whereby a foam product comprising a crosslinked product of the Composition A and the Composition B can be successfully obtained.

Other features of this invention will become apparent in the course of the following description of exemplary embodiments, which are given for illustration of the invention and are not intended to be limiting thereof.

EXAMPLE 1

Preparation of Supported Catalyst

A flask thoroughly purged with nitrogen gas was charged with 100 ml of dehydrated and deoxygenated n-heptane. 0.1 mol of $MgCl_2$ and 0.20 mol of $Ti(O-nBu)_4$ were then added to the n-heptane, followed by a reaction at 100° C. for two hours. After the reaction was completed, the reaction mixture was cooled to a temperature of 40° C., and 15 ml of methylhydrogenpolysiloxane was then added thereto. The resulting mixture was subjected to a reaction for three hours. The solid product thus obtained was washed with n-heptane. It was found that 15.2% by weight of titanium, and 4.2% by weight of magnesium were contained in the product.

A flask thoroughly purged with nitrogen gas was charged with 100 ml of dehydrated and deoxygenated n-heptane. To the n-heptane was added the above obtained product in an amount of 0.03 mol on magnesium atom basis. Thereafter, 0.05 mol of $SiCl_4$ was added to the above mixture at 30° C. over a period of 15 minutes, followed by a reaction at 90° C. for two hours. After the reaction was completed, the product thus obtained was washed with purified n-heptane. To the washed product was added a mixture of 25 ml of n-heptane and 0.004 mol of ortho-$C_6H_4(COCl)_2$ at a temperature of 50° C., and then added 0.05 mol of $SiCl_4$. The resulting mixture was subjected to a reaction at 90° C. for two hours. After completion of the reaction, the reaction product was washed with n-heptane, thereby obtaining a supported catalyst. It was found that 2.05% by weight of titanium was contained in the catalyst.

Preparation of Copolymer

In a one-liter autoclave purged with propylene were placed 330 ml of n-heptane, 0.1 g of triethylaluminum, 0.04 g of diphenyldimethoxysilane and 0.07 g of the above-prepared supported catalyst in the order named. After introducing 125 Nml of hydrogen to the autoclave, propylene was further introduced to the autoclave with pressure, and the mixture was stirred at a temperature of 50° C. under a pressure of 0.5 kg/cm$^2$G. Thereafter, 70 ml of 7-methyl-1,6-octadiene was added to the reaction mixture, and the resulting mixture was heated while introducing propylene thereto with pressure, followed by a polymerization reaction at 65° C. for five hours under a pressure of 5.5 kg/cm$^2$G. To the reaction product was added n-butanol to inactivate the catalyst, and the residue of the catalyst was removed therefrom by extraction with water. Finally, a polymer was collected by centrifugal separation, and then dried, thereby to obtain 194 g of a powdery random copolymer, having a bulk density of 0.50 g/cc, according to the present invention. the amount of an amorphous polymer was 5.4 g.

An MFR of the copolymer thus obtained was 3.5 g/10 minutes, and a peak temperature of fusion thereof determined by DSC was 149.1° C. According to the measurement by $H^1$-NMR, the copolymer contained 2.6 mol % of monomer units of 7-methyl-1,6-octadiene. It was also found that the monomer units of this diene were not linked with each other in the copolymer, and were in the 1,2-addition structure. The crystallization degree of the copolymer determined by X-ray diffraction was 38.0%, and the modulus of flexural elasticity according to JIS K-7203 was 6,250 kg/cm$^2$. The haze according to JIS K-7105 was 49%.

Example 2

The procedure for preparing the copolymer in Example 1 was repeated except that the amount of the supported catalyst employed in Example 1 was changed from 0.07 g to 0.08 g, the amount of the 7-methyl-1,6-octadiene was changed from 70 ml to 60 ml, propylene containing 1.2% by weight of ethylene was introduced after the addition of the 7-methyl-1,6-octadiene, and the polymerization temperature was changed from 65° C. to 60° C., thereby obtaining 182 g of a random copolymer of the present invention in the form of dried powder. The amount of an amorphous polymer was 9.3 g.

The bulk density and the MFR of the copolymer powder thus obtained were 0.45 g/cc and 2.8 g/10 minutes, respectively. The peak temperature of fusion of the copolymer determined by DSC was 131° C. The copolymer contained 2.4 mol % of monomer units of 7-methyl-1,6-octadiene and 1.9 mol % of monomer units of ethylene. It was found that the monomer units of this diene were not linked with each other in the copolymer, and were in the 1,2-addition structure. The crystallization degree of the copolymer determined by X-ray diffraction was 28.8%, and the modulus of flexural elasticity according to JIS 203 was 4,700 kg/cm$^2$ The haze according to JIS K-7105 was 43%.

REFERENTIAL EXAMPLE 1

In a one-liter autoclave purged with propylene was placed 400 ml of an 8:2 (molar ratio) mixture of 4-methyl-1,4-hexadiene and 5-methyl-1,4-hexadiene. To this mixture were then added 0.9 g of triethylaluminum, 0.36 g of diphenyldimethoxysilane and 0.4 g of the supported catalyst prepared in Example 1 in this order. Thereafter, 50 Nml of hydrogen was introduced to the autoclave, and propylene was then further introduced with pressure, followed by stirring at 25° C. under a pressure of 2.5 kg/cm$^2$. The reaction mixture was heated while introducing propylene with pressure, and a reaction was carried out at a temperature of 65° C. under a pressure of 8 kg/cm$^2$G for two hours. As a result, 114 g of a copolymer in the form of dried powder having a bulk density of 0.41 g/cc was obtained. The amount of an amorphous polymer was 5.9 g.

The MFR of the copolymer thus obtained was 2.2 g/10 minutes, and the peak temperature of fusion determined by DSC was 152.0° C. According to the measurement by $H^1$-NMR, the copolymer contained 3.8 mol % of monomer units of methyl-1,4-hexadiene. It was found that the monomer units of this diene were not linked with each other, and were in the 1,2-addition structure. The crystallization degree of the copolymer determined by X-ray diffraction was 41%, and the modulus of flexural elasticity according to JIS K-7203 was 5,200 kg/cm$^2$. The haze according to JIS K-7105 was 58%.

REFERENTIAL EXAMPLE 2

In a 100-liter autoclave was placed 40 liter of an 8:2 (molar ratio) mixture of 4-methyl-1,4-hexadiene and 5-methyl-1,4-hexadiene (this mixture is hereinafter referred to as methyl-1,4-hexadiene). To this mixture were added 18 g of diethylaluminum chloride, and then 4.1 g of titanium trichloride commercially available from Marubeni Solvey Corporation, Japan. Thereafter, hydrogen and propylene were introduced into the autoclave to make the total pressure to 1.5 kg/cm$^2$ (gauge pressure), and the hydrogen content to 2.0% by volume, and the temperature of the reaction system was maintained at 25° C. for 15 minutes. Propylene was then further introduced into the autoclave with pressure to make the total pressure to 6.5 kg/cm$^2$G and the hydrogen content to 6.8% by volume, and a polymerization reaction was conducted at 55° C. for 6 hours. During this reaction, ethylene was charged to the reaction mixture with a constant rate of 0.52 kg/hr. As a result, 7.5 g of a copolymer was obtained in the form of dried powder. The amount of an amorphous polymer was 1.3 g.

The MFR of the copolymer thus obtained was 3.8 g/10 minutes, and the peak temperature of fusion determined by DSC was 133° C. The copolymer was determined to contain 2.0 mol % of monomer units of methyl-1,4-hexadiene, and 5.0 mol % of monomer units of ethylene. The modulus of flexural elasticity of the copolymer according to JIS K-7203 was 4,000 kg/cm$^2$ The haze according to JIS K-7105 was 50%.

EXAMPLE 3

100 parts by weight of the random copolymer prepared in Example 1, 0.3 parts by weight of dicumenyl-peroxide, and 0.1 parts by weight of "Irganox 1010" (Trademark) were kneaded at 200° C. for 6 minutes, thereby to obtain a crosslinked product of the copolymer according to the present invention.

The gel fraction of the crosslinked product thus obtained was determined in the following manner:

1.0 g of the product was weight and placed on an 80-mesh metallic wire net was subjected to extraction by xylene at the melting point for 10 hours. Thereafter, undissolved portion of the product remaining on the wire net was dried, and weighed. The gel fraction which is the percentage of the weight of the undissolved portion of the product to the weight of the product before being subjected to the above operation was 51% by weight.

The MFR at a temperature of 230° C. with a load of 2.16 kg was unmeasurable because the product did not flow under such conditions. However, the MFR of the product determined at a temperature of 230° C. with a load of 10 kg was 0.63 g/10 minutes.

EXAMPLE 4

The procedure in Example 3 was repeated except that the random copolymer prepared in Example 1 employed in Example 3 was replaced by the random copolymer prepared in Example 2, thereby to obtain a crosslinked product of the copolymer according to the present invention.

The gel fraction of the crosslinked product thus obtained was 58% by weight. The MFR at a temperature of 230° C. with a load of 2.16 kg was unmeasurable because the product did not flow under such conditions. However, the MFR of the product determined at a temperature of 230° C. with a load of 10 kg was 0.47 g/10 minutes.

COMPARATIVE EXAMPLE 1

The procedure in Example 3 was repeated except that the random copolymer prepared in Example 1 employed in Example 3 was replaced by the copolymer prepared in Referential Example 1, thereby to obtain a comparative crosslinked product of the copolymer.

The gel fraction of the crosslinked product thus obtained was 30% by weight. The MFR of the product determined at a temperature of 230° C. with a load of 2.16 kg was 0.40 g/10 minutes, and the MFR determined with a load of 10 kg was 18 g/10 minutes.

COMPARATIVE EXAMPLE 2

The procedure in Example 3 was repeated except that the random copolymer prepared in Example 1 employed in Example 3 was replaced by the polypropylene, "Mitsubishi Polypro MH6" (Trademark), thereby to obtain a comparative crosslinked product of the polypropylene.

The gel fraction of the crosslinked product thus obtained was 0% by weight. The MFR of the product determined at a temperature of 230° C. with a load of 2.16 kg was 15 g/10 minutes. However, the MFR at a temperature of 230° C. with a load of 10 kg was unmeasurable because the product revealed excessively high fluidity under such conditions.

EXAMPLE 5

100 parts by weight of the random copolymer prepared in Example 1, 0.05 parts by weight of "Irganox 1010" (Trademark), and 0.05 parts by weight of BHT were mixed and kneaded at 210° C. by an extruder having a diameter of 30 mm. The resin thus obtained was processed to a sheet with a thickness of 2 mm by pressing. An electron beam was applied to the sheet by an electron beam accelerator until the absorbed doses of the sheet became 2 Mrad and 10 Mrad, respectively, thereby to obtain crosslinked products according to the present invention.

The gel fractions, tensile strengths, and abrasion resistances of the crosslinked products thus obtained were respectively determined. The results are shown in Table 1.

The abrasion resistance of the sheet was determined in the following manner:

The above-obtained sheet of 75 mm $\times$ 25 mm in size was rotated in Toyoura standard sand at a rotating speed of 700 rpm for five hours. The abrasion resistance was evaluated with respect to the weight of the sheet reduced by the above operation.

EXAMPLE 6

The procedure in Example 5 was repeated except that the random copolymer prepared in Example 1 employed in Example 5 was replaced by the random copolymer prepared in Example 2, thereby to obtain crosslinked products according to the present invention.

The gel fractions and tensile strengths of the products thus obtained were respectively determined. The results are shown in Table 1.

COMPARATIVE EXAMPLE 3

The procedure in Example 5 was repeated except that the random copolymer prepared in Example 1 employed in Example 5 was replaced by the copolymer prepared in Referential Example 3, thereby to obtain comparative crosslinked products.

The gel fractions, tensile strengths, and abrasion resistances of the products thus obtained were respectively determined. The results are shown in Table 1.

COMPARATIVE EXAMPLE 4

The procedure in Example 5 was repeated except that the random copolymer prepared in Example 1 employed in Example 5 was replaced by polypropylene, "Mitsubishi Polypro MH6" (Trademark), thereby to obtain comparative crosslinked products.

The gel fractions, tensile strengths, and abrasion resistances of the products thus obtained were respectively determined. The results are shown in Table 1.

The data shown in Table 1, regarding the crosslinked products obtained in Examples 5 and 6 and Comparative Examples 3 and 4 clearly demonstrate that the crosslinked products according to the present invention are superior to the comparative ones in the gel fraction and in the other properties which are governed by the gel fraction, namely abrasion resistance, tensile strength and elongation.

TABLE 1

| Item | Example 5 | | | Example 6 | | | Comp. Ex. 3 | | | Comp. Ex. 4 | | |
|---|---|---|---|---|---|---|---|---|---|---|---|---|
| Absorbed Dose (Mrad) | 0 | 2 | 10 | 0 | 2 | 10 | 0 | 2 | 10 | 0 | 2 | 10 |
| Gel Fraction (% by wt.) | 0 | 85 | 92 | 0 | 81 | 91 | 0 | 66 | 81 | 0 | 0 | 0 |
| Tensile Strength (kg/cm$^2$) | 410 | 385 | 335 | 395 | 375 | 340 | 380 | 350 | 300 | 380 | 320 | 250 |
| Tensile Elongation at Break (%) | 750 | 640 | 360 | 750 | 630 | 460 | 760 | 690 | 440 | 700 | 150 | 20 |
| Abrasion Resistance (mg) (weight reduced) | 104 | 22 | 14 | — | — | — | 102 | 87 | 55 | 90 | 115 | 200< |

EXAMPLE 7

100 parts by weight of the random copolymer prepared in Example 2, 0.05 parts by weight of "Irganox 1010" (Trademark), and 1.0 part by weight of peroxide, "Perhexa 2.5B" (Trademark) manufactured by Nippon Oil & Fats Co., Ltd., Japan, were mixed, and extruded at 145° C. to obtain a sheet with a thickness of 2 mm. The sheet was placed in a mold for compression pressing, and was heated to 180° C. for three minutes to cause a crosslinking reaction.

The gel fraction of the above-obtained crosslinked product according to the present invention was 76 % by weight.

EXAMPLE 8

100 parts by weight of the random copolymer prepared in Example 2, 0.05 parts by weight of "Irganox 1010" (Trademark), and 15 part by weight of azodicarboxylic amide were mixed, and extruded at 145° C. by an extruder equipped with a coat hanger die having a width of 300 mm, thereby to obtain a sheet with a thickness of 2 mm. An electron beam was applied to this sheet by an electron beam accelerator until the absorbed dose of the sheet became 1 Mrad. The sheet thus treated was then placed in a fused salt bath at a temperature of 220° C. for 2 minutes and 15 seconds, whereby a crosslinked foam product according to the present invention was obtained.

The product thus obtained had a gel fraction of 48% by weight, an apparent gravity of 0.045 g/ml, and uniform independent cells with an average diameter of 300 μm.

A peeling test was carried out, in which adhesive tape was adhered to the surface of the above foam product, and then peeled. As a result, the tape was not peeled off the foam product at the interface therebetween, but the foam product was broken upon peeling. From this, it can be known that the adhesion between the tape and the foam product is sufficiently high.

The tensile strength and elongation and the rigidity at 25% compression of the foam product were respectively measured in accordance with JIS K-6767. As a result, the tensile strength was 14.9 kg/cm$^2$, the elongation was 430%, and the rigidity at 25% compression was 1.65 kg/cm$^2$.

COMPARATIVE EXAMPLE 5

The procedure in Example 7 was repeated except that the copolymer prepared in Referential Example 2 was used to produce a sheet of the crosslinked product.

The crosslinked product of the sheet had the gel fraction at such a low level as 61% by weight.

COMPARATIVE EXAMPLE 6

The procedure in Example 8 was repeated except that the random copolymer prepared in Example 2 employed in Example 8 was replaced by the copolymer prepared in Referential Example 2, and the absorbed dose was changed from 1 Mrad to 3 Mrad, thereby to obtain a comparative crosslinked foam product.

The foam product thus obtained had a gel fraction of 43 % by weight, an apparent specific gravity of 0.048 g/ml, and uniform independent cells. The tensile strength of the product was 10.9 kg/cm$^2$, the elongation was 440%, and the rigidity at 25% compression was 0.92 kg/cm$^2$ These values were thus obtained at an absorbed dose larger than that required in the procedure in Example 8.

It was thus found that the comparative crosslinked foam product was inferior to the crosslinked foam product of the present invention.

COMPARATIVE EXAMPLE 7

A copolymer was prepared in accordance with the description of Example 1 in the Specification of Japanese Laid-Open Patent Application No. 2-51512. The procedure in Example 5 was then repeated except that the random copolymer prepared in Example 1 employed in Example 5 was replaced by the above-obtained copolymer, thereby to obtain a comparative crosslinked product.

More particularly, in a ball mill pot purged with a nitrogen gas were placed 100 mmol of magnesium chloride, 7.5 mmol of ethyl benzoate, 15 mmol of titanium tetrachloride, and 64 ml of n-hexane, followed by grinding and mixing at room temperature for 7 hours. The mixture was then washed with 400 ml of n-hexane five times to obtain a product for use as a transition metal catalyst in the polymerization given below.

200 ml of dehydrated n-hexane, and 5 ml of dehydrated 7-methyl-1,6-octadiene were placed in a 500-ml three-necked flask which had been purged with nitrogen gas in advance. To the flask put in a water bath at 30° C. was supplied a 1:1 (molar ratio) gas mixture of ethylene and propylene at a rate of 4 lit./min for 5 minutes whereby the gas mixture was dissolved therein. After the gas mixture was dissolved, 3 mmol of triisobutyl aluminum and 0.03 mmol (titanium atom base) of the above-prepared catalyst were added, in this order, to the reaction mixture, followed by a polymerization reaction at 30° C. while supplying the mixed gas thereto. After 30 minutes, 10 ml of a mixture of methanol and hydrochloric acid was added to the reaction mixture to terminate the polymerization reaction. The reaction product was coagulated by methanol, and then dried in a vacuum drier. As a result, 7.6 g of a copolymer was obtained. The molar ratio of monomer units of ethylene to those of propylene contained in the copolymer was 31:69. Moreover, the amount of monomer units of 7-methyl-1,6-dioctadiene contained in the copolymer was 3.0 mol % which corresponded to an iodine value of 18.

100 parts by weight of the above-obtained copolymer, 0.05 parts by weight of "Irganox 1010" (Trademark), and 0.05 parts by weight of BHT were mixed, and kneaded at 210° C. by an extruder with a diameter of 30 mm. The resulting resin was processed to a sheet with a thickness of 2 mm by pressing. An electron beam was applied to this sheet by an electron beam accelerator until the absorbed dose of the sheet became 10 Mrad. The crosslinked product thus obtained was evaluated with respect to the items shown in Table 2. The crosslinked product obtained in Example 5 was also evaluated with respect to the same items, and the results are shown in Table 2 for comparison.

Among the evaluation items, scratching rigidity using pencil, heat-deformation rate, modulus of flexural elasticity, and oil resistance were determined in the following manner:

(1) Scratching Rigidity Using Pencil

The measurement was conducted in the same manner as in JIS K-5401 except that the loaded weight was changed to 500 g.

(2) Heat-Deformation

The deformation rate was determined by loading a weight of 1 kg on each sheet of 15 mm×30 mm×2 mm in size at 120° C. for 30 minutes.

(3) Modulus of Flexural Elasticity

Determined in accordance with JIS K-7203.

(4) Oil Resistance (Degree of Swelling)

The oil resistance was evaluated by a rate of increase in the weight of the sheet after dipping it into an oil of JIS No. 3 at 80° C. for 96 hours.

(5) Gel Fraction

A sample housed in 80 mesh metal net is subjected to Soxhlet extraction with xylene for 10 hours. The remain unextracted was dried in vacuo and weighed to calculate the % by weight of the remain in the sample as the gel fraction.

TABLE 2

| Item | Comp. Ex. 6 | Example 5 |
|---|---|---|
| Gel Fraction (wt. %) | 88 | 92 |
| Hardness A | 58 | 100 |
| Hardness D | 12 | 71 |
| Tensile Strength (kg/cm²) | 27 | 335 |
| Tensile Elongation at Break (%) | 200 | 360 |
| Abrasion Resistance weight loss (mg) | 25 | 14 |
| Scratching Rigidity Using Pencil | 5B | HB |
| Heat-Deformation (%) | 7.7 | 0.5 |
| Modulus of Flexural Elasticity (kg/cm²) | 60 | 6100 |
| Oil Resistance (%) | 460 | 20 |

What is claimed is:

1. A random copolymer of (a) an α-olefin having 3 to 12 carbon atoms, (b) a branched non-conjugated diene selected from the group consisting of 6-methyl-1,5-heptadiene, 6-methyl-1,5-octadiene, 6-methyl-1,6-octadiene, 7-methyl-1,6-octadiene, 7-ethyl-1,6-octadiene and 8-methyl-1,7-nonadiene and (c) optionally ethylene, which random copolymer comprises 0.1 to 15 mol % of monomer units of said branched non-conjugated diene, 0 to 4 mol % of monomer units of ethylene, and pendent ethylenical unsaturations, and has a crystallization degree of 20% or more determined by an X-ray diffraction method, a melt index of 0.01 to 200 g/10 minutes, and a modulus of elasticity according to ASTM D790M-86 of 1,000 to 30,000 kg/cm².

2. A random copolymer according to claim 1, wherein said non-conjugated diene is 7-methyl-1,6-octadiene.

3. A crosslinked product of a random copolymer of (a) an α-olefin having 3 to 12 carbon atoms, (b) a branched non-conjugated diene selected from the group consisting of 6-methyl-1,5-heptadiene, 6-methyl-1,5-octadiene, 6-methyl-1,6-octadiene, 7-methyl-1,6-octadiene, 7-ethyl-1,6-octadiene and 8-methyl-1,7-nonadiene and (c) optionally ethylene, which random copolymer comprises 0.1 to 15 mol % of monomer units of said branched non-conjugated diene, 0 to 4 mol % of monomer units of ethylene, and pendent ethylenical unsaturations, and has a crystallization degree of 20% or more determined by an X-ray diffraction method, gel fraction of 5 wt % or more, a melt index of 0.01 to 100 g/10 minutes, and a modulus of elasticity according to ASTM D790M-86 of 1,000 to 30,000 kg/cm², the crosslinking having taken place through the pendent ethylenical unsaturations.

4. A crosslinked product according to claim 3, wherein said branched non-conjugated diene is -b 7-methyl-1,6-octadiene.

5. A crosslinked product of a random copolymer of (a) an α-olefin having 3 to 12 carbon atoms, (b) a branched non-conjugated diene selected from the group consisting of 6-methyl-1,5-heptadiene, 6-methyl-1,5-octadiene, 6-methyl-1,6-octadiene, 7-methyl-1,6-octadiene,7-ethyl-1,6-octadiene and 8-methyl-1,7-nonadiene and (c) optionally ethylene, which random copolymer comprises 0.1 to 15 mol % of monomer units of said branched non-conjugated diene, 0 to 4 mol % of monomer units of ethylene, and pendent ethylenical unsaturations, and has a crystallization degree of 20% or more determined by an X-ray diffraction method, gel fraction of 5 wt % or more, a melt index of 0.01 to 100 g/10 minutes, and a modulus of elasticity according to ASTM D790M-86 of 1,000 to 30,000 kg/cm², the crosslinking having taken place through the pendent ethylenical unsaturations under such conditions that said random copolymer is foamed, and the resultant crosslinked product prepared is in the form of foam.

6. A crosslinked product of a random copolymer of (a) an α-olefin having 3 to 12 carbon atoms, (b) a branched non-conjugated diene selected from the group consisting of 6-methyl-1,5-heptadiene, 6-methyl-1,5-octadiene, 6-methyl-1,6-octadiene, 7-methyl-1,6-octadiene, 7-ethyl-1,6-octadiene and 8-methyl-1,7-nonadiene and (c) optionally ethylene, which random copolymer comprises 0.1 to 15 mol % of monomer units of said branched non-conjugated diene, 0 to 4 mol % of monomer units of ethylene, and pendent ethylenical unsaturations, and has a crystallization degree of 20% or more determined by an X-ray diffraction method, gel fraction of 5 wt % or more, a melt index of 0.01 to 100 g/10 minutes, and a modulus of elasticity according to ASTM D790M-86 of 1,000 to 30,000 kg/cm², the crosslinking having taken place through the pendent ethylenical unsaturations, in the form of a blend of the random copolymer with a thermoplastic polymer compatible therewith, and the resultant crosslinked product prepared in the form of a blend of the random copolymer crosslinked with the thermoplastic polymer.

7. A crosslinked product according to claim 6, wherein said thermoplastic resin is a polymer of an α-olefin.

8. A blend which comprises (i) Component A which is a random copolymer, and (ii) Component B which is a thermoplastic polymer compatible therewith, said Component A being a random copolymer of (a) an α-olefin having 3 to 12 carbon atoms, (b) a branched non-conjugated diene selected from the group consisting of 6-methyl-1,5-heptadiene, 6-methyl-1,5-octadiene, 6-methyl-1,6-octadiene, 7-methyl-1,6-octadiene, 7-ethyl-1,6-octadiene and 8-methyl-1,7-nonadiene and (c) optionally ethylene, which random copolymer comprises up to 15 mol % of monomer units of said branched non-conjugated diene, 0 to 4 mol % of monomer units of ethylene, and pendent ethylenical unsaturations, and has a crystallization degree of 20% or more determined by an X-ray diffraction method, a melt index of 0.01 to 200 g/10 minutes, and a modulus of elasticity according to ASTM D790M-86 of 1,000 to 30,000 kg/cm$^2$, the amount of monomer units of said branched, non-conjugated diene in said random copolymer being controlled such that said blend comprises 0.1 mol % or more and less than 15 mol % of monomer units of said branched non-conjugated diene.

9. A blend according to claim 8, wherein said branched non-conjugated diene is 7-methyl-1,6-octadiene.

* * * * *